(12) United States Patent
Scholer et al.

(10) Patent No.: US 7,624,990 B2
(45) Date of Patent: Dec. 1, 2009

(54) THREAD SEALANTS WITH ENGINEERED FIBERS

(75) Inventors: Fred Richard Scholer, East Windsor, NJ (US); John Wrobleski, Andover, NJ (US)

(73) Assignee: Hercules Chemical Company Inc., Passaic, NJ (US)

(*) Notice: Subject to any disclaimer, the term of this patent is extended or adjusted under 35 U.S.C. 154(b) by 161 days.

(21) Appl. No.: 11/402,414

(22) Filed: Apr. 11, 2006

(65) Prior Publication Data

US 2006/0276349 A1 Dec. 7, 2006

Related U.S. Application Data

(60) Provisional application No. 60/670,746, filed on Apr. 12, 2005.

(51) Int. Cl.
| | |
|---|---|
| C10M 101/04 | (2006.01) |
| C10M 169/04 | (2006.01) |
| F16L 17/00 | (2006.01) |
| F16L 21/02 | (2006.01) |
| F16L 33/16 | (2006.01) |
| H02G 15/04 | (2006.01) |
| H02G 15/013 | (2006.01) |

(52) U.S. Cl. .................. 277/602; 277/314; 508/128; 508/122; 508/127

(58) Field of Classification Search .............. 508/127, 508/122, 128, 148, 151; 277/314, 602
See application file for complete search history.

(56) References Cited

U.S. PATENT DOCUMENTS

| 3,879,302 A * | 4/1975 | Reick ..................... 508/138 |
| 5,536,422 A * | 7/1996 | Oldiges et al. ............ 508/121 |
| 5,741,764 A * | 4/1998 | Patel et al. .................. 508/459 |
| 6,606,749 B2 * | 8/2003 | Underwood et al. ............ 2/93 |
| 6,858,160 B2 * | 2/2005 | Taylor et al. ............. 252/389.3 |
| 7,091,161 B2 * | 8/2006 | Oldiges et al. ............. 508/154 |
| 2004/0214732 A1 * | 10/2004 | Oldiges et al. ............. 508/390 |
| 2004/0229760 A1 * | 11/2004 | Oldiges et al. ............. 508/154 |

OTHER PUBLICATIONS

Notification Concerning Transmittal of International Preliminary Report on Patentability and Written Opinion of the International Searching Authority dated May 18, 2007.
International Preliminary Report on Patentability and Written Opinion of the International Searching Authority dated Oct. 30, 2007, for International Application No. PCT/US2006/013359.
Megaloc™ Thread Sealant Spec Sheet #S0089 (Apr. 1998).
Hercules Chemical Material Safety Data Sheet #89 Megaloc™ (Jun. 29, 2004).
Megaloc® Multi-Purpose Thread Sealant Product Label (2001).

* cited by examiner

*Primary Examiner*—Karl E Group
*Assistant Examiner*—Noah S Wiese
(74) *Attorney, Agent, or Firm*—K&L Gates LLP

(57) ABSTRACT

A sealant is provided that possesses many or all of the characteristics of conventional thread sealants, and allows application with improved smoothness and uniformity of application. Sealants in accordance with the invention utilize engineered fibers such as melamines like Basofill and polyaramids such as Kevlar in its composition. Engineered fibers offer consistency and uniformity that other previously used sealants lack. Engineered fibers can improve the gap filling characteristics of the sealant, as well as the resistance of the sealant to chemicals and high pressures. Engineered fibers tend to have very high strength and low density.

20 Claims, No Drawings

THREAD SEALANTS WITH ENGINEERED FIBERS

CROSS REFERENCE TO RELATED APPLICATION

This application claims the benefit under 35 U.S.C. § 119(e) of application Ser. No. 60/670,746, filed Apr. 12, 2005, the contents of which are incorporated herein by reference.

BACKGROUND OF THE INVENTION

The invention relates generally to sealants and more particularly to thread sealant compositions, their method of manufacture and their use.

Thread sealants can be used by plumbers to form a tough, pliable film on threaded pipes and valve connections, flanged surfaces, gaskets and bolts to provide a leak-proof resistance to high pressure and temperature, expansion, contraction and extreme vibration. Thread sealants have long been used by the plumbing industry to provide leak-proof resistance to threaded joints, pipes, gaskets, flanges and couplings. Traditional thread sealant is composed of hydrocarbon oils, vegetable oils, animal oils, fillers and fibers. Alternative materials for sealing threads include Teflon tape, paper and rubber products or anaerobic chemicals.

Gaskets and paper products relax and can form a minute separation or leak path. Solvent based thread sealants, often referred to as pipe dope sealants, rely on solvents and natural fibers. Once the solvent evaporates, the uneven character of the natural fibers and filling materials can also lead to minute leak paths. Teflon tape is often used where there is over tightening of the seal and may shred, leading to leaks or downstream pipe contamination. Anaerobic thread sealants, once cured, are difficult to remove from a pipe thread. For all of these thread sealant approaches, leaks may still occur due to system vibrations, thermal cycling, pulsing of liquid or gas contents, poor application or improper thread design. Leaks from these sources cost millions of dollars a year in lost material, damage to the environment and inefficient use of the transferred material.

Conventional thread sealants exhibit several additional disadvantages. They are typically not smooth and can be difficult to apply evenly and uniformly to pipes. Conventional sealants do not generally offer consistent performance from batch to batch and have a high propensity for leakage at high pressure and temperature because of the inconsistency in the structure of the fibers included. For example, solvent based thread sealants typically include fillers made of inorganic minerals, such as clays, calcium carbonate and fibrous material to enhance the resistance to high pressure leakage. The fibrous materials typically include natural organic matter, such as wool or leather and synthetic fibers, such as polyfluoroethylene (PTFE). Sealants that include natural organic material lack consistency because of the variations in the density and length of the fibers, as well as variations in the fibers' ability to absorb and bind to solvents employed. Consequently, sealants produced have slightly different properties varying from batch to batch. Although synthetic fibers, such as PTFE, are more uniform, the resulting sealants tend to be too pasty and hard to apply most effectively.

Another drawback is the inability of clay/mineral based thread sealants to resist the pressure and temperature found in many applications, because the oil, fibers, and mineral fillers separate under pressure from either tightening of the threaded joints or the application of pressure within the pipe.

Another problem with conventional thread sealants is that they are not always sufficiently forgiving with respect to filling thread imperfections. In the average threaded fitting, metal to metal contact is approximately 20%. 80% is air space surrounding the spiral threads, creating a potential fluid or gas leak path. The size and scope of the path can be dramatically affected by vibration, shock, thermal and environmental changes. They can also be intolerant of poor application. Thread sealants utilizing natural fibers are also susceptible to mildew, aging and exposure to sunlight.

Traditionally, plumber's thread sealant uses high levels, usually between 6%-25%, of fibers and thickeners to improve the ability to withstand high pressure and/or temperature. However, the high levels of fibers produce a thick sealant with visible fibers, making the sealant more difficult to apply. The brushes used to apply the sealant to the pipe threads often wind up separating the fibers from the oils in the formulation leaving "clumps" of threaded material inconsistently spread around the threads and areas where there is far more oil than fiber. This can lead to leaks.

Accordingly, it is desirable to provide an improved thread sealant that overcomes drawbacks of conventional sealants.

SUMMARY OF THE INVENTION

Generally speaking, in accordance with the invention, a sealant is provided that possesses many or all of the characteristics of conventional thread sealants, and allows application with improved smoothness and uniformity of application. Sealants in accordance with the invention utilize engineered fibers such as melamines like Basofill and polyaramids such as Kevlar in its composition. Engineered fibers offer consistency and uniformity that other previously used sealants lack. Engineered fibers can improve the gap filling characteristics of the sealant, as well as the resistance of the sealant to chemicals and high pressures. Engineered fibers tend to have very high strength and low density. Upon addition to the mineral oil matrix they should make the composition mixture stiffer without adding significant weight. The above mentioned properties should be consistent and without significant variation from batch to batch.

In order to meet the requirements and use conditions of plumber's thread sealant, preferred embodiments of the invention provide sealants that have a smooth consistency and utilize low density, and high strength engineered fibers. Sealants in accordance with the preferred embodiments of the invention can be easily applied to threaded pipe joints. They can have sufficient fiber and mineral filler levels to fill gaps or thread imperfections. Embodiments of the invention can be insoluble in water and resistant to gases and corrosive liquids. They can be resistant to temperature changes, vibrations and pulsations, environmental changes and thermal changes and contain no chemical or components, which can cause or assist in the migration materials to be transported within the pipe. Furthermore, compositions in accordance wit the invention can allow the joints to be easily disassembled without damage to pipe or equipment.

Engineered fibers also have a much broader operating temperature range than natural fibers (e.g., −200° C. to +350° C.) and are also resistant to bacteria, fungus and mold. They can also withstand high pressure and offer greater strength. Synthetic fibers, such as glass, are also inappropriate in that they cannot stand static loads for any length of time. Naturally occurring fibers have the same limitation. Engineered fibers are typified by, but not restricted to, the class of chemicals, such as melamines, polyacrylic fibers, polyaramids, polyimides, polyacrylonitrile, polysulfones, nylon, etc.

The oil or solvent portion of the invention can range from oils used in typical pipe dopes to more permanent oils, such as polymeric plasticizers to curative type solvents, which can cross link or bond during the application.

Accordingly, it is the object of this invention to provide a sealant that overcomes drawbacks of conventional sealants through the incorporation of engineered fibers into the composite mix of oils, minerals and fillers.

Still other objects and advantages of the invention will in part be obvious and will in part be apparent from the specification.

The invention accordingly comprises the several steps and the relation of one or more step with respect to each of the others, and the composition possessing the features, properties, and the relation of the components, which are exemplified in the following detailed disclosure, and the scope of the invention will be indicated in the claims.

DETAILED DESCRIPTION OF THE PREFERRED EMBODIMENTS

The invention comprises, but is not restricted to, a sealant comprising a combination of natural oils and solvents useful to disperse the fillers, such as mineral particles, and engineered fibers. A preferred composition contains 35-60% liquids and 65-40% solids, preferably 45-50% liquids and 55-50% solids, most preferably, where the ratio of liquid to solid is close to 1:1.

Natural oils can provide the appropriate rheological properties and resistance to changes in temperature. The preferred natural oils should have a medium molecular weight, preferably 300 to 1500 molecular weight units. Synthetic oils, such as glycerol fatty ester with an average molecular weight range of 400-800 are acceptable. Products that typify this component are CP Hall's Paraplex series, typified by Paraplex G54, which is an adipate based ester or the PC 45/70, which is a processed animal oil series supplied by George Pfau Company of Jeffersonville, Ind. Moreover, permanent oils, based on polymeric plasticizers, such as CP Hall's Paraplex series, i.e. Paraplex G-40 series, can also be used to impart greater permanency to the thread seal.

Another preferred liquid component of the invention is hydrocarbon oil which is exemplified by Fina Elf Lubricant's Lubelf 68 having density of 7.28 lbs/gal at 60° F., pour point of 5° F., specific gravity of 0.874 and viscosity SUS of 284-346 at 100° F.

The solid component can include engineered fibers and inorganic minerals. The inorganic minerals act as fillers to fill gaps in the threads. The engineered fibers act as a scaffold upon which the oils and mineral fillers are dispersed. Compared to natural fibers, which tend to have no internal, consistent structure, engineered fibers can provide a scaffold of advantageous strength and structure for the thread sealant components to adhere to. Thus the overall performance of the thread sealant as measured by resistance to gas or fluid pressure can be improved. The sealing properties of thread sealants and compounds dependent on the specific combination, particle sizes and quantities of solid components.

Unlike natural fibers used in traditional plumber's thread sealant that often come from inconsistent sources and cause the resulting sealants to suffer irregularities and inconsistencies, engineered fibers can provide uniform length, dimension and density to the sealant. A sealant with engineered fibers can be applied evenly and uniformly to pipes. Engineered fibers can offer consistency and uniformity that other sealants lack. Engineered fibers can improve the gap-filling characteristic of the sealant, as well as the resistance of the sealant to chemicals and high pressures.

Although synthetic fibers, such as PTFE, cellulosic fibers, are more uniform than natural fibers, synthetic fibers can produce very pasty sealants, which makes application difficult and uneven. Engineered fibers can provide the uniformity of the synthetic fibers without sacrificing the strength or ease of application. Engineer fibers can be flexible to accommodate a broad range of manufacturing methods and application conditions.

Engineered fibers suitable for the use in the current invention, should have a high aspect ratio (length/diameter), which allows a large fraction to be applied to a surface at the minimum weight. Engineered fibers used should also demonstrate good dimensional stability and resistance to heat, cold and corrosion. Density of engineered fibers should be low, preferably about 1-3 g/cc, bulk density=3-7 lbs/ft$^3$, but the tensile strength should preferably be high (>1.8 GPa). The stiffness should be low, which implies that the addition of engineered fibers improves strength and density, but not at the cost of increasing stiffness or density.

By using engineered fibers, the invention allows a lower level of fibers to be used compared to traditional thread sealant without sacrificing the ability to withstand high pressure and/or temperature, because of the strength and uniformity of the engineered fibers. The reduced level of fibers allows the sealant to be applied more easily, smoothly and uniformly. Consequently, the reduced level of fibers allows a higher level of inorganic mineral fillers to be use in the composition, improving leak and pressure resistance.

The engineered fibers also impart to the thread sealant a rheological profile; therefore the sealant will behave in a thixotropic manner when pressure is applied. This means that as the thread seal is tightened the sealant will flow uniformly throughout the threads and provide gap fill to the threads or imperfections found in the threads.

The use of engineered fibers can also result in the elimination of thickeners as used in the traditional thread sealant.

The engineered fiber content ranges preferably from 0.2 to 10.00% of total weight, preferably from 0.5-2.00%.

Engineered fibers include polyamides, melamines, para and meta-aramids, polysulfones, polyesters, polypropylene, ethylene fibers, cellulosic fibers and polyacrylonitrile fibers. These fibers are normally cut to specific lengths and are also highly fibrillated. The use of the fibrillated engineered fibers provides a smooth plumber's sealant paste, which is easily applied to threaded joints, gap fills thread imperfections, operates over a broad range of temperatures and pressures and maintains a tight seal even when the required torque for closing the pipe thread seal has been insufficiently applied. The range of fiber length is preferably 1-5 mm and 10-15 microns in diameter.

The most preferred engineered fibers, which provide the best support structure or scaffold for the sealant components, are fibers based on melamine and polyaramid. The former are typified by Basofill™, specifically Basofill 79, which has an average diameter of 15 microns, specific gravity of 1.4, fiber lengths of 1-5 mm and a tensile strength of 36 KSI. The latter by Kevlar® and Nomex® specifically Kevlar Brand Pulp, which has an average specific gravity of 1.5 and an average diameter of 10-15 microns. The invention prefers the use of polyaramid or melamine by itself, but they can be used in combination as well. Kevlar is discussed in U.S. Pat. No. 3,819,587, the contents of which are incorporated herein by reference.

As used herein, Kevlar refers to poly (p-phenylene terephtalamide) fibers, which comprise the following structure:

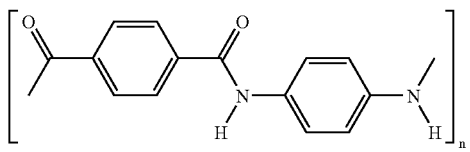

wherein the aromatic groups are all linked into the backbone chain through the 1 and 4 positions.

As used herein, Basofil refers to melamine networks comprising the following chemical structure:

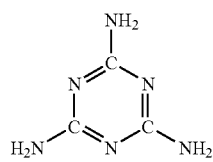

The inorganic mineral portion of the thread sealant composition can comprise montmorillonite clay, such as kaolin and a wallastonite mineral. Montmorillonite clay provides a certain degree of smoothness and structural stability to the thread sealant, whereas the wallastonite provides strength through its fibrous structure. The preferred ratio is 3:1 to 1:1, preferably at 2.5:1 to 1.5:1 between wallastonite and kaolin clay, making up 10-50%, preferably about 20-40% of the total composition, most preferably around 30%.

Another preferred sealant composition has a solid component that is a combination of calcium carbonate and kaolin in the ratio of 3:1 to 5:1, preferably about 3.5:1 to 4.5:1. The preferred percentage of the total composition ranges about 70-82%, most preferably about 74-78%.

Besides the aforementioned minerals, other additives, such as bentones, can be added to improve smoothness. These should be used in low quantities in order to avoid premature aging or solidification of the putty. Rheology agents, such as bentones, will immediately thicken the composite mixture of oils and minerals to a degree of thickness that the fibers selected for this application cannot be easily mixed into the bulk system. This thickening process occurs within minutes of mixing.

The use of engineered fibers can provide a degree of safety in the preparation and performance of the threaded seal under pressure. The invention can be smoothly and easily applied by brush and adheres to the threaded joint prior to completion of the process. This invention also will not dry out or crack over the lifetime of the threaded joint. Thus, sealants in accordance with the invention will not dry out and crack for more than one year and typically, much longer. It will retain its adhesive qualities, stable consistency and its ability to maintain the gap fill voids.

| COMPOSITION FOR TYPICAL PRODUCTION BATCH | | | |
|---|---|---|---|
| | Tradename | Parts | Weight (lbs) |
| PART A | | | |
| Hydrocarbon Oil | Lubelf 68 | 42.90 | 815 |
| Alcolec S, | | 4.70 | 75.0 |
| Castor Oil | Pale Oil 45 | 4.70 | 75.0 |
| Castor Oil | Pale Oil 75 | 4.70 | 75.0 |

| -continued | | | |
|---|---|---|---|
| COMPOSITION FOR TYPICAL PRODUCTION BATCH | | | |
| | Tradename | Parts | Weight (lbs) |
| PART B | | | |
| Pigment | Phalo Blue Paste | 0.07 | 1.125 |
| Bentone 34 | Bentone 34 | 0.60 | 10 |
| Titanium dioxide | | 2.0 | 32 |
| PART C | | | |
| Fumed Silica | Aerosil | 0.7 | 11.2 |
| Polyamide | Kevlar | 1.5 | 24 |
| Kaolin Clay | Royal Qeen Clay | 17 | 270 |
| Wallastonite | Nytal 300 | 21.13 | 340 |

Mixing Instructions

1. Charge Part A to clean stainless steel tub.
2. Place tub under high speed disperser and begin blending with standard speed blender.
3. When uniform, start disperser and add Part B in the order listed.
4. When uniform, turn off all agitation and move batch to a planetary mixer.
5. Start agitation and begin adding Kevlar slowly to achieve uniform dispersion.
6. When all the Kevlar is uniformly dispersed, add the rest of Part C and mix until uniform.

TABLE ONE

| EXAMPLE SEALANT COMPOSITIONS | | | | | |
|---|---|---|---|---|---|
| Comparative example- Typical Thread Sealant | % by wgt | Engineered Pipe Thread Sealant | % by wgt | Product Type | Source |
| Hydrocarbon Oil | 42 | Hydrocarbon Oil | 35 | Elf Lubelf 78 | Fina Elf Lubricants |
| Vegetable Oil | 10 | Vegetable Oil | 10 | PC-45, 70, 110 | G. Pfau Chemical |
| Surfactant | 4 | Surfactant | 4 | Alcolec S | Textile Chemicals |
| Thickening Agent | 1 | Thickening Agent | 0 | Bentone 34 | Elementis |
| Mineral Fillers | 31 | Mineral Fillers | 48 | Kaolin Titanium Dioxide Nytal | HM Royal |
| Fiber | 6 | Engineered Fiber | 1 | Kevlar Brand Pulp Basofill 7910 1:1 ratio | DuPont BASF |
| Whitener | 6 | Whitener | 2 | | |

The performance of the plumber's thread sealant is measured by performing four pressure tests under different conditions utilizing a variety of engineered fibers. The general formula for the samples used is listed in Table One, with different amounts of different engineered fibers used in the composition. Table Two shows the results from using various engineered fibers.

TABLE TWO

PERFORMANCE DATA

| Engineered Fiber | Std Thread Sealant (% by weight) | Kevlar | A | B | C | D | E | F | G |
|---|---|---|---|---|---|---|---|---|---|
| Natural fiber | 6% by weight | | | | | | | | |
| Melamine | | | 1 | | | | | | |
| Melamine | | | | 1 | | | | | |
| Polyester | | | | | 2 | 1.5 | | | |
| Cellulose | | | | | | | 1.5 | | |
| Kevlar | | 1.3 | 1.5 | 1.5 | | | 1 | 1 | 1 |
| Test 1 - Low Press 150 psi | 200 | 200 | 200 | 200 | F* | F | 200 | 200 | 200 |
| Test 2 - Low Torque Test @ 150 psi | 100 | 65 | 64 | 55 | | | 88 | 80 | 85 |
| Test 3 - Air 2600 psi - 200 in lbs | $P^2$ | P** | P | P | | | $P^2$ | $F(300)^1$ | $P^2$ |
| Test 4 - Hydraulic 10,000 psi | P | P | P | P | | | F | NA | NA |

*F = failed
**P = passed

Test 1—For the first pressure test, the low-pressure 150 psi test performed by utilizing a Simples hydraulic pump, which is connected through means of a threaded joint to a pipe containing a pressure gauge. The pipe thread is closed with a torque wrench rated at 200 in-lbs. The pressure is brought to 150 psi and held for 24 hours with no apparent sign of a leak.

Test 2—Test 1 is repeated, but the torque rating is lowered to 150 psi. The first sign of a leak is indicated in Table Two Thus, the natural fiber thread sealant began to leak at 100 in-lbs, whereas the engineered fibers all showed an ability to be loosened further to as low as 55 in-lbs. This demonstrates the ability of the engineered fiber compositions to gap fill and resist leakages even though the thread seal joint has been loosened.

Test 3 and Test 4—For the air pressure test at 2600 psi and the hydraulic test at 10,000 psi similar results are obtained. For the either test, the pressure apparatus used is a Simples hydraulic pump, which is connected through means of a threaded joint to a pipe containing a pressure gauge. The pipe thread is closed with a torque wrench rated at 200 in-lbs. The pressure is brought to either 2600 or 10,000 psi and held for 30 minutes and signs of a leak are detected through use of a liquid bubble detector.

It will thus be seen that the objects set forth above, and those made apparent from the preceding description, are efficiently attained and, since certain changes may be made in the above construction without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A sealant composition comprising
    a liquid component comprising one or more oils, one or more solvents, or combinations thereof; and
    a solid component comprising
        engineered fibers selected from polyamides, melamines, para-aramids, meta-aramids, polysulfones, polyesters, polypropylenes, ethylenes, cellulose, polyacrylonitriles, and combinations thereof, wherein the engineered fibers comprise about 0.5% to about 2% of the total weight of the composition;
        inorganic minerals comprising a first silicate component and a second silicate component in a ratio between about 3:1 and about 1:1, wherein the first silicate component comprises a calcium silicate mineral, a magnesium silicate mineral, or mixtures thereof, and the second silicate component comprises a clay mineral selected from montmorillonite clay and kaolin clay; and
        a non-soap-based thickening agent comprising an organoclay.

2. The composition of claim 1, wherein the engineered fibers comprise poly(p-phenylene terephthalamide) fibers.

3. The composition of claim 1, wherein the engineered fibers comprise melamine fibers comprising the structure

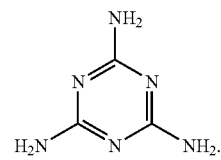

4. The composition of claim 1, wherein the liquid component comprises about 45% to about 50% of the total weight of the composition, and the solid component comprises about 50% to about 55% of the total weight of the composition.

5. The composition of claim 1, wherein the liquid component comprises a natural oil having an average medium molecular weight range of about 300 to about 1500.

6. The composition of claim 1, wherein the liquid component comprises a synthetic oil having an average medium molecular weight range of about 400 to about 800.

7. The composition of claim 1, wherein the liquid component comprises a glycerol fatty ester.

8. The composition of claim 1, wherein the liquid component comprises a hydrocarbon oil.

9. The composition of claim 1, wherein the liquid component comprises a polymeric plasticizer.

10. The composition of claim 1, wherein the engineered fibers comprise polyaramid fibers, melamine fibers, or combinations thereof.

11. The composition of claim 1, wherein the engineered fibers are selected from polyacrylics, polyamides, polyacrylonitriles, polysulfones and nylon fibers.

12. The composition of claim 1, wherein the inorganic minerals comprise wollastonite and kaolin clay, and comprise about 10% to about 50% of the total weight of the composition.

13. A method of using the sealant composition of claim 1 to seal threaded joints in a plumbing application, the method comprising:
   applying the sealant composition of claim 1 to a threaded region of a first pipe, and
   connecting the threaded region of the first pipe to a threaded region of a second pipe by exerting torque pressure and forming a watertight seal.

14. The method of claim 13, wherein the engineered fibers comprise polyaramid fibers, melamine fibers, or combinations thereof.

15. The method of claim 13, wherein the engineered fibers are selected from polyacrylics, polyamides, polyacrylonitriles, polysulfones and nylon fibers.

16. The method of claim 13, wherein the inorganic minerals comprise wollastonite and kaolin clay, and comprise about 10% to about 50% of the total weight of the sealant composition.

17. The composition of claim 1, wherein the liquid component comprises a surfactant.

18. The composition of claim 1, wherein the engineered fibers have a fiber length between about 1 mm and about 5 mm, an average diameter between about 10 microns and about 15 microns, and a tensile strength greater than about 1.8 GPa.

19. The composition of claim 1, wherein the liquid component comprises about 45% to about 50% of the total weight of the composition and the solid component comprises about 50% to about 55% of the total weight of the composition, and wherein:
   the engineered fibers comprise polyaramid fibers, melamine fibers, or combinations thereof; and
   the inorganic minerals comprise between about 10% and about 50% of the total weight of the composition and further comprise a third silicate component comprising fused silica.

20. A method of making a sealant composition, the method comprising:
   blending a liquid component comprising one or more oils, one or more solvents, or a combination thereof;
   contacting the liquid component with one or more additives, wherein the one or more additives comprise a non-soap-based thickening agent comprising an organoclay;
   contacting the liquid component with engineered fibers selected from polyamides, melamines, para-aramids, meta-aramids, polysulfones, polyesters, polypropylenes, ethylenes, cellulose, polyacrylonitriles, and combinations thereof, the engineered fibers comprising about 0.5% to about 2% of the total weight of the composition;
   contacting the liquid component with inorganic minerals comprising a first silicate component and a second silicate component in a ratio between about 3:1 and about 1:1, wherein the first silicate component comprises a calcium silicate mineral, a magnesium silicate mineral, or mixtures thereof, and the second silicate component comprises a clay mineral selected from montmorillonite clay and kaolin clay; and
   agitating a resulting composition comprising the liquid component, the one or more additives, the engineered fibers, and the inorganic minerals to provide a uniform dispersion.

* * * * *